United States Patent [19]

Reilly et al.

[11] Patent Number: 4,899,249

[45] Date of Patent: Feb. 6, 1990

[54] FLUORINE-CONTAINING DIELECTRIC MEDIA AND CAPACITORS EMPLOYING SUCH MEDIA

[75] Inventors: James L. Reilly, Towamencin; Ludwig K. Huber, Wayne; Gordon R. Leader, Chester, all of Pa.

[73] Assignee: Pennwalt Corporation, Philadelphia, Pa.

[21] Appl. No.: 184,524

[22] Filed: Apr. 21, 1988

[51] Int. Cl.$^4$ .................. H01G 4/22; H01B 3/24; H01F 27/12
[52] U.S. Cl. .................. 361/317; 174/17 LF; 336/94; 252/574; 252/575; 252/580; 564/80; 564/84; 564/90; 564/92; 564/95; 564/96; 564/97; 564/98; 564/99

[58] Field of Search .............. 252/574, 575, 580; 564/96, 90, 80, 84, 92, 95, 97, 98, 99; 174/17 LF, 25 C; 336/58, 94; 361/317

[56] References Cited

U.S. PATENT DOCUMENTS

| 2,236,168 | 3/1941 | Dietrich | 564/80 |
| 3,536,749 | 10/1970 | Groves | 564/96 |
| 3,684,932 | 8/1972 | Ross et al. | 252/576 |
| 4,098,711 | 7/1978 | Rogers | 252/521 |

Primary Examiner—A. Lionel Clingman
Assistant Examiner—Christine A. Skane

[57] ABSTRACT

A dielectric medium composition comprising a fluorine-containing amide or a fluorine-containing sulfonamide and capacitors or other electric devices incorporating said composition, are disclosed herein.

13 Claims, 1 Drawing Sheet

FLUORINE-CONTAINING DIELECTRIC MEDIA AND CAPACITORS EMPLOYING SUCH MEDIA

BACKGROUND

This invention was made with Government support under DNA-001-86-C-0176 awarded by the Defense Nuclear Agency. The Government has certain rights in this invention.

This invention relates to compositions having superior surface tension and dielectric constant properties making them highly useful as dielectric media in electric devices. More particularly, it relates to compositions of fluorine-containing amides and fluorine-containing sulfonamides useful as dielectric media in capacitors and other electrical devices, such as, switches, coils and transformer which require such materials to replace air which has a low dielectric constant and low breakdown strength.

Capacitors usually consist of alternate layers of a metal-foil conductor and a sheet (or sheets) of solid dielectric material such as a polymer film and/or Kraft paper. Many polymer and copolymer films, for example, polypropylene, polyvinylidene fluoride and polyesters, are currently used in the manufacture of capacitors. Depending on their intended use, capacitors may require an insulating medium referred to as a dielectric impregnant. This impregnant has a substantially higher breakdown strength (voltage) and dielectric constant when compared to air; therefore, more energy may be reliably stored in a fluid impregnated capacitor.

The selection of a good dielectric media must take into account many factors in addition to the dielectric constant and breakdown strength. These other factors include: surface tension, vapor pressure, viscosity, thermal stability, corrosivity to metals and solubility of various polymer films in the media. The surface tension, which is a direct indication of the wetting ability of a fluid media, is especially important since the fluid must wet all parts of the capacitor winding in order to be truly effective. Voltage breakdown and the resulting catastrophic failure of the capacitor will occur at the weakest point, i.e., any area not completely wet with the fluid.

Dielectric fluids which are currently used throughout the industry have low dielectric constants and high surface tensions. The compositions of this invention have an advantageous combination of both high dielectric constant and low surface tension resulting in superior electrical devices in which they are employed.

STATEMENT OF INVENTION

This invention is a dielectric medium containing an effective amount of a compound, or mixtures thereof, having one of the following formulae:

(a) $R^1(CONR^2R^3)_m$, (b) $(R^2CON)_m R_n^2 R_o^3$,
(c) $R^1(SO_2NR^2R^3)_m$, or (d) $(R^1SO_2N)_m R_n^2 R_o^3$ wherein $R^1$ is a saturated or unsaturated alkyl or unsubstituted mono- or polyfunctional hydrocarbon radical having 1 to 12 carbon atoms, a cycloalkyl having 3 to 12 carbon atoms, an aryl radical having 6 to 12 carbon atoms or an alkaryl radical having 7 to 12 carbon atoms, said radicals substituted with at least two fluorine atoms, $R^2$ and $R^3$ are the same or different and independently selected from saturated and unsaturated alkyl or unsubstituted mono- or polyfunctional hydrocarbon radicals having 1 to 12 carbon atoms, cycloalkyl radicals having 3 to 10 carbon atoms, aryl radicals having 6 to 10 carbon atoms, or alkaryl radicals wherein the alkyl moiety has 1 to 6 carbon atoms, $R^2$ and $R^3$ may together form the ring of single cycloalkyl radical having 3 to 10 carbon atoms, m, n and o are independently integers of from 1 to 5, and in compounds of formulae (a) and (b), at least one $R^3$ may be hydrogen.

The term "effective amount" as used herein means an amount sufficient to improve the wetting ability of the medium in fluid form and to provide a medium having an improved dielectric constant compared to commonly used dielectric fluids, e.g., tricresyl phosphate. Such amount may, for example, range from 25 to 100%, by volume of the dielectric medium.

This invention is also an electrical device containing as a component a dielectric medium as defined above.

THE DRAWINGS

DETAILED DESCRIPTION OF THE INVENTION

Figure 1:
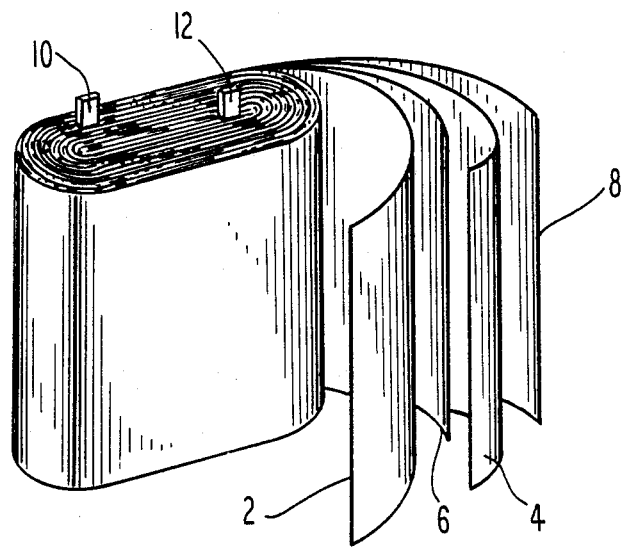
FIG. 1 is a perspective view of a convolutely wound capacitor.

The radicals represented by $R^1$ in the above formulae and as previously identified, may be substituted with a halogen or $-XR$ where X is $-O-$, $-S-$, $-SO-$, $-SO_2-$, $-CO-$ or $-CO_2-$ and where R is an alkyl radical having 1 to 11 carbon atoms, a cycloalkyl radical having 3 to 11 carbon atoms, an aryl radical having 6 to 12 atoms, or an alkaryl radical wherein the alkyl moiety has 1 to 6 carbon atoms. Furthermore, the radicals represented by $R^2$ and $R^3$ are previously identified, may be independently substituted with a halogen or $-XR$ where X and R are the same as recited above; the halogens preferably include chlorine, fluorine, and bromine.

Alkyl radicals are, for example, methyl, ethyl, propyl, allyl, butyl, pentyl, propargyl, hexyl, heptyl, octyl, nonyl, decyl, undecyl and dodecyl radicals and isomeric forms thereof. Additionally, unsubstituted polyfunctional hydrocarbon radicals, eg., alkylene radicals, are represented by $R^1$-$R^3$. The cycloalkyl radicals will include, for example, cyclopropyl, cyclopentyl, cyclohexyl, cyclooctyl, cyclodecyl and cyclododecyl radicals. The aryl radicals will include, for example, phenyl and naphthyl. The alkaryl radicals will include, for example, methylphenyl, butylphenyl and hexylphenyl.

$R^1$ is substituted with at least two fluorine atoms, preferably from 3 to 25 and more preferably from 3 to 11 fluorine atoms.

Representative amides falling within the above formula are:

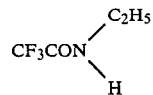

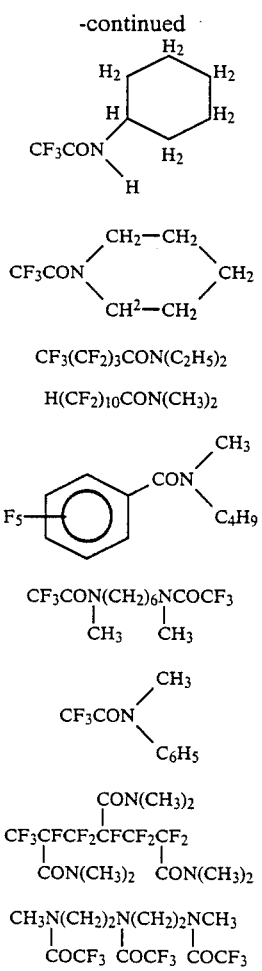

$CF_3(CF_2)_3CON(C_2H_5)_2$ $H(CF_2)_{10}CON(CH_3)_2$ $CF_3CON(CH_2)_6NCOCF_3$
   |        |
   $CH_3$   $CH_3$ $CF_3CFCF_2CFCF_2CF_2$ with $CON(CH_3)_2$ groups $CH_3N(CH_2)_2N(CH_2)_2NCH_3$
   |         |         |
   $COCF_3$  $COCF_3$  $COCF_3$ Representative sulfonamides falling within the above formulas are:

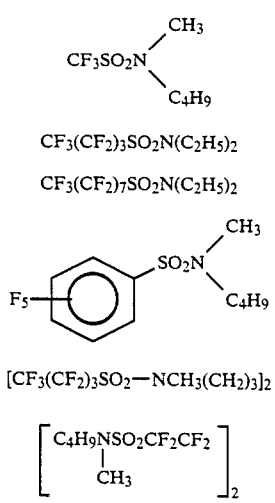

$CF_3(CF_2)_3SO_2N(C_2H_5)_2$ $CF_3(CF_2)_7SO_2N(C_2H_5)_2$ $[CF_3(CF_2)_3SO_2-NCH_3(CH_2)_3]_2$ $\left[ \begin{array}{c} C_4H_9NSO_2CF_2CF_2 \\ | \\ CH_3 \end{array} \right]_2$ Other representative amides and sulfonamides include, for example, the N,N-di($C_1$-$C_4$) alkyl trifluoroacetamides, the N-($C_1$-$C_8$) alkyl trifluoroacetamides an the N,N-di($C_1$-$C_4$) alkyl trifluorosulfonamides.

Depending on their particular structure, the dielectric media of this invention may be either liquids or solids. For impregnation purposes, the solids can be applied as melts.

The dielectric compositions of this invention may contain small amounts of additives, such as acid scavengers, corrosion inhibitors, biocides, flame retardants and antioxidants. These novel dielectric media can be used as the sole impregnant or in combination with other conventional dielectric media (e.g., dioctyl phthalate). Surfactants which lower the surface tension of the dielectric medium can also be added. Conversely, other ingredients may be added to these dielectric media which during impregnation selectively migrate into the plastic film and increase the wettability (critical surface tension) of the film and, thereby, make impregnation of the capacitor winding more facile.

These dielectric compositions are used to impregnate a wide variety of polymer films (e.g., polyethylene, polypropylene, polyesters, polycarbonate, polysulfones, polyamides, vinyl polymers, etc.), but they are especially useful in capacitors incorporating fluorinated polymer films (e.g., polyvinylidene fluoride, polyvinyl fluoride, polytetrafluoroethylene and their copolymers). Fluorinated polymers have a low critical surface tension and therefore will resist wetting by most fluids. Optimum wetting (i.e., free spread or zero contact angle of the liquid) on a surface is only obtained when the surface tension of the liquid is less than the critical surface tension of the solid. The compositions described here offer the important property of low surface tension along with other desirable properties, such as high dielectric constant, good thermal stability and low viscosity.

Figure 2:
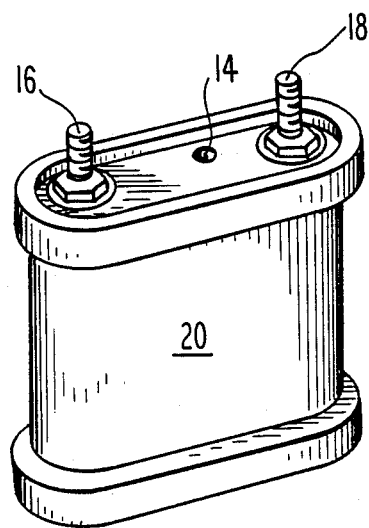
FIG. 2 is a perspective view of a hermetically sealed container for the capacitor of FIG. 1.

Capacitors employing the present invention may have the general structure as shown in FIG. 1 which is a convolutely wound capacitor comprising separate electrode foils 2 and 4 and intermediate dielectric spacers 6 and 8. Electrode posts 10 and 12 attached, respectively, to foils 2 and 4, are shown near the center of the winding. Electrode foils may comprise one or more of a number of different materials, generally metallic, including aluminum and copper. Dielectric spacers 6 and 8 comprise polymeric, paper and/or composite polymer films such as previously described. The dielectric spacers and electrode foil windings taken together comprise a capacitor element. This element is encased in a hermetically sealed container 20 shown in FIG. 2 which includes a small dielectric fluid fill hole 14 and electrical contact posts 16 and 18 which are extensions of posts 10 and 12, respectively. The capacitor element is dried under vacuum at a temperature above room temperature and moisture and gases escape through the fluid fill hole. The impregnating dielectric medium, in fluid form, is admitted through hole 14 preferable while the dried assembly is still under vacuum. The capacitor element in the container must be submerged by the impregnating fluid. The pressure of the enclosure is raised to atmospheric pressure and the assembly is permitted to stand or soak for a number of hours for thorough penetration of the liquid impregnant. Repeated vacuum and soaking cycles may be necessary to insure complete removal of all gases and complete impregnation.

After impregnation, the fluid fill hole 14 may be sealed with solder or some other suitable sealant. The capacitor assembly 20 after sealing may be subjected to an elevated temperature to increase the pressure inside the capacitor which will aid impregnation. During heating and cooling cycles, expansion and contraction of the electrode and dielectric windings may induce small movements which aid in introducing the fluid into the spaces between the various winding materials.

The following examples are set forth to demonstrate the present invention.

EXAMPLE 1

N,N-Dimethyl Perfluorobutyramide

A 3-necked flask, equipped with magnetic stirrer, reflux condenser and gas inlet tube, was charged with 121 g (0.5 mole) of ethyl perfluorobutyrate. The contents of the flask were heated to 60° C. and a slow stream of dimethylamine was passed in. The reaction is exothermic and the gas flow rate was adjusted to keep the temperature in the range of 60°–70° C. without external heat. Gas flow was continued until the weight increase of the flask showed absorption of 22.5 g (0.5 mole) of the amine.

A helices packed distilling column was then attached to the flask and the contents were heated to drive off excess amine and distill out the ethanol by-product. Finally, the pressure was reduced and the product amide was distilled over at 89° at a pressure of 72 mmHg. Yield 92.9%.

Dielectric constant and loss at 100 kHz were, respectively, 24.7 and 0.35

Surface tension was found to be 22.2 dynes/cm (23.5° C.).

EXAMPLE 2

N,N-Diethyl Perfluorobutane Sulfonamide

Under a blanket of nitrogen, a mixture of 55 g (0.180 moles) of perfluorobutane sulfonyl fluoride and 70.7 g (0.970 moles) of diethylamine was heated at reflux for nine hours. The reaction mixture was dissolved in 600 ml of ether and percolated through a column of 60 g of acidic alumina. The ether was stripped and the product was distilled at 56°–58° C. at 2.0 mm. Yield 41.6 g (65%).

Dielectric constant and loss at 100 kHz were, respectively, 18.5 and 0.03.

Surface tension was found to be 21.5 dynes/cm (23.5° C.).

EXAMPLE 3

N,N-Dibutyl Trifluoroacetamide

Under a blanket of nitrogen, 2020.9 g (14.22 moles) of ethyl trifluoroacetate was charged to a 12-liter flask equipped with an overhead stirrer, an addition funnel, thermometer, and a condenser. To the stirred ethyl trifluoroacetate, 2015.0 g (15.59 moles) of dibutyl amine was added over a two hour period, during which the temperature of the stirred reaction mixture rose from 20° to 40° C. At the end of the addition period, the reaction flask was equipped with an 8 inch packed column and distillation head. The ethanol by-product was then removed by distillation with a maximum pot temperature of 135° C. The reaction mixture was then cooled and the product was isolated by distillation, boiling range 79°–87° C. at 2.2–3.2 mmHg. Yield 2850 g (89.0%).

Dielectric constant and loss at 100 kHz were, respectively, 21.4 and 0.3.

Surface tension was found to be 23.5 dynes/cm (23.5° C.).

EXAMPLE 4

N,N-Diethyl Trifluoromethane sulfonamide

Under a blanket of dry nitrogen, a mixture of 143.4 g (1.96 mole) of diethyl amine and 350 ml of chloroform in a one liter flask was cooled to 10° C. in an ice bath. To this stirred mixture 250.0 g (0.886 mole) of trifluoromethane sulfonic anhydride were added dropwise over a four hour period. During the addition the temperature was kept below 20° C. After the addition was complete the reaction mixture was heated at reflux for 30 minutes and then cooled to room temperature. The reaction mixture was then washed with two 500 ml portions of 10% hydrochloric acid and two 500 ml portions of distilled water. The organic phase was then dried over magnesium sulfate and the chloroform was removed under vacuum. The light yellow liquid was then percolated through a column of 50 g freshly kilned (400° C.) Porocel (Engelhart). Yield 103 g (66%).

Dielectric constant and loss at 100 kHz were, respectively, 33.1 and 0.03.

Surface tension was found to be 21.9 dynes/cm (23.5° C.).

EXAMPLE 5

N-Ethyl Trifluoroacetamide

Ethyl trifluoroacetate (143 g, 1.0 m) was placed in a 500 ml 3-neck equipped with stirrer, gas inlet tube, thermometer, and a reflux distilling head. With rapid stirring a stream of monoethylamine was fed quickly into the liquid. Within 1½ hours, 80 g amine (1.8 m) were added resulting in an exotherm which brought the pot temperature to 62° C. The reaction mixture was allowed to sit at ambient temperature overnight and then distilled. A total of 123 g product distilled at 86° C./50 mm Hg.

The product had a dielectric constant of 99.6 and a loss of 0.46 at 100 kHz. Its surface tension at room temperature was 23.1 dynes/cm. A solution in $H_2O$/isopropanol (95/5) was essentially neutral (pH 8.2).

EXAMPLE 6

N-Butyl Trifluoroacetamide

Ethyl trifluoroacetate (298 g, 2.1 m) was reacted in a manner similar to Example 5 with n-butylamine (169 g, 2.3 m), except that the amine was added as a liquid within 1 hour. After the exotherm (peak 56° C.) had subsided, the reaction mixture was heated under reflux for 3½ hours (pot temperature 96° to 98° C.). The mixture was then distilled to yield 193 g of a liquid which boiled at 83° C./7 mm Hg.

The dielectric constant and loss of the product at 100 kHz were, respectively, 70.4 and 0.30. Its surface tension at ambient temperature was 23.6 dynes/cm.

EXAMPLE 7

N-(1-Methylpropyl) Trifluoroacetamide

In a procedure similar to Example 6, ethyl trifluoroacetate (295 g, 2.07 m) was reacted with sec-butylamine. The resulting amide distilled at 72.5° C./8 mm Hg and amounted to 285 g.

The dielectric constant and loss of the product at 100 kHz were, respectively, 59.7 and 0.12. Its surface tension at ambient temperature was 23.0 dynes/cm.

EXAMPLE 8

N-Hexyl Trifluoroacetamide

In a manner similar to Example 6, ethyl trifluoroacetate (131 g, 0.92 m) was reacted with n-hexylamine. The resulting amide distilled at 64° C./0.2 mm Hg and amounted to 154 g.

The dielectric constant and loss of the product at 100 kHz were, respectively, 53.8 and 0.16. Its surface tension at ambient temperature was 24.3 dynes/cm.

EXAMPLE 9

N-(1,1,3,3-Tetramethyl) Butyl Trifluoroacetamide

In a procedure similar to Example 6, ethyl trifluoroacetate (100 g, 0.7 m) was reacted with t-octylamine (94 g, 0.72 m). The resulting amide was distilled at 68°–81° C./1–3 mm Hg, and 65 g of product were recovered. The product melted at 55°–58° C.

EXAMPLE 10

N-Cyclohexyl Trifluoroacetamide

In a manner similar to Example 6, ethyl trifluoroacetate (102 g, 0.72 m) was reacted with cyclohexylamine (70 g, 0.7 m). By-products/unreacted material were removed by heating the reaction mixture under increasing vacuum (final pressure 3 mm Hg) to 118° C. The pot residue was then recrystallized from hot ethyl acetate (~60 g) plus hexanes (~100 g) to yield 58 g solid which melted at 93°–95° C.

A solution of the product in H$_2$O/isopropanol (95/5) was essentially neutral (pH 7.55). A 1% solution in ethyl acetate had a surface tension of 22.6 at ambient temperature.

EXAMPLE 11

N,N-Pentamethylene Trifluoroacetamide

This example represents the case of N,N-disubstituted fluorinated amides where R$^2$ and R$^3$ are linked together to form a ring.

In a procedure similar to Example 6, ethyl trifluoroacetate (174 g, 1.2 m) was reacted with piperidine (102 g, 1.2 m). The resulting amide distilled at 70° C./6 mm Hg. to yield 192 g.

Dielectric constant and loss of the product at 100 kHz were, respectively, 25.0 and 0.22. The surface tension was 22.9 dynes/cm.

The dielectric constant and surface tension of the above prepared media may be compared with dielectric fluids which are commonly used throughout the capacitor manufacturing industry as shown in the following table.

TABLE 1

|  | Dielectric Constant (100 kHz) | Surface Tension (dynes/cm) |
|---|---|---|
| Monoisopropyl biphenyl | 2.8 | 34 |
| Tricresyl phosphate | 7.4 | 44 |
| Dioctyl phthalate | 4.5 | 31 |

It is evident that the dielectric media of this invention have substantially higher dielectric constants and lower surface tensions than the dielectric fluids of Table 1.

What is claimed is:

1. A dielectric medium containing an effective amount of a compound, or mixtures thereof, having one of the following formulae:

(c) R$^1$(SO$_2$NR$^2$R$^3$)$_m$, or (d) (R$^1$SO$_2$N)$_m$R$^2$$_n$R$^3$$_o$ wherein R$^1$ is a saturated or unsaturated alkyl or unsubstituted mono- or polyfunctional hydrocarbon radical having 1 to 12 carbon atoms, a cycloalkyl radical having 3 to 12 carbon atoms, an aryl radical having 6 to 12 carbon atoms or an alkaryl radical having 1 to 6 carbon atoms in the alkyl moiety, said radicals substituted with at least two fluorine atoms, R$^2$ and R$^3$ are the same or different and independently selected from saturated and unsaturated alkyl or unsubstituted mono- or polyfunctional hydrocarbon radicals having 1 to 12 carbon atoms, cycloalkyl radicals having 3 to 10 carbon atoms, aryl radicals having 6 to 10 carbon atoms or alkaryl radicals having 1 to 6 carbon atoms in the alkyl moiety, R$^2$ and R$^3$ may together form the ring of a single cycloalkyl radical having 3 to 10 carbon atom, m, n and o are independently integers of from 1 to 5.

2. The dielectric medium of claim 1 wherein R$^1$ is a perfluoroalkyl radical having 3 to 25 fluorine atoms.

3. The dielectric medium of claim 2 wherein R$^2$ and R$^3$ are alkyl radicals having 1 to 12 carbon atoms.

4. The dielectric medium of claim 1 wherein said medium contains a compound of the formula R$^1$(SO$_2$NR$^2$R$^3$)$_m$.

5. The dielectric medium of claim 4 wherein said medium contains N,N-diethyl perfluorobutane sulfonamide.

6. The dielectric medium of claim 4 wherein said medium contains an N,N-di(C$_1$–C$_4$) alkyl trifluoromethane sulfonamide.

7. The dielectric medium of claim 1 wherein R$^2$ and R$^3$ together form a ring of a single cycloalkyl radical.

8. The dielectric medium of claim 7 wherein said cycloalkyl radical is cyclopentyl and m is 1.

9. An electrical device containing as a component the dielectric medium of claim 1.

10. The electrical device of claim 9 comprising a capacitor containing dielectric solid sheets impregnated with the dielectric medium of claim 1.

11. The electrical device of claim 10 wherein the sheets are impregnated with the dielectric medium of claim 2.

12. The electrical device of claim 10 wherein the sheets are impregnated with the dielectric medium of claim 4.

13. The electrical device of claim 10 wherein the sheets are impregnated with the dielectric medium of claim 7.

* * * * *